(12) United States Patent
Thurman et al.

(10) Patent No.: US 9,096,747 B2
(45) Date of Patent: *Aug. 4, 2015

(54) ISOTACTIC POLYPROPYLENE NUCLEATION

(75) Inventors: Derek Thurman, Houston, TX (US); Sudhin Datta, Houston, TX (US); Wen Li, Houston, TX (US); Charles L. Sims, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 761 days.

This patent is subject to a terminal disclaimer.

(21) Appl. No.: 12/013,183

(22) Filed: Jan. 11, 2008

(65) Prior Publication Data

US 2008/0249248 A1 Oct. 9, 2008

Related U.S. Application Data (60) Provisional application No. 60/922,463, filed on Apr. 9, 2007.

(51) Int. Cl.
| | | |
|---|---|---|
| *C08L 23/04* | (2006.01) | |
| *C08L 23/10* | (2006.01) | |
| *C08L 23/14* | (2006.01) | |
| *C08L 23/12* | (2006.01) | |

(52) U.S. Cl.
CPC ............... *C08L 23/10* (2013.01); *C08L 23/142* (2013.01); *C08L 23/12* (2013.01); *C08L 2205/02* (2013.01)

(58) Field of Classification Search
CPC ........................................................ C08L 23/10
USPC ................................................. 525/240, 191
See application file for complete search history.

(56) References Cited

U.S. PATENT DOCUMENTS

| | | | |
|---|---|---|---|
| 4,645,792 A | 2/1987 | Chatterjee | |
| 4,749,736 A | 6/1988 | Khanna et al. | |
| 6,635,715 B1 | 10/2003 | Datta et al. | |
| 6,747,114 B2 | 6/2004 | Karandinos et al. | |
| 6,780,936 B1* | 8/2004 | Agarwal et al. | 525/191 |
| 2002/0004575 A1* | 1/2002 | Cozewith et al. | 526/348 |
| 2003/0195300 A1* | 10/2003 | Stevens et al. | 525/240 |
| 2004/0157999 A1* | 8/2004 | Agarwal et al. | 525/240 |
| 2005/0043470 A1* | 2/2005 | Stevens et al. | 524/543 |
| 2005/0054781 A1* | 3/2005 | Dharmarajan et al. | 525/240 |
| 2005/0106978 A1 | 5/2005 | Cheng et al. | |
| 2006/0025531 A1* | 2/2006 | Datta et al. | 525/240 |
| 2006/0135699 A1 | 6/2006 | Li et al. | |
| 2006/0172647 A1 | 8/2006 | Mehta et al. | |
| 2006/0293453 A1* | 12/2006 | Jiang et al. | 525/191 |
| 2007/0015877 A1 | 1/2007 | Burkhardt et al. | |
| 2007/0240605 A1 | 10/2007 | Iyer et al. | |

FOREIGN PATENT DOCUMENTS

| | | |
|---|---|---|
| WO | WO 99/07788 | 2/1999 |
| WO | WO 2006/065663 | 6/2006 |
| WO | WO 2006/113132 | 10/2006 |

OTHER PUBLICATIONS

Bourland, Polymer Preprints (American Chemical Society, Division of Polymer Chemistry) 28(2), 385-387 (1987).
Bourland, Plastics Engineering (Brookfield, CT, United States), 43(7), 39-41 (1987).
Pospisil, Journal of Materials Science Letters, 9(4), 495-496 (1990).
Janimak, Polymer Bulletin (Berlin, Germany), 22(1), 95-101 (1989).

* cited by examiner

*Primary Examiner* — Irina Krylova (57) ABSTRACT

Low molecular weight semicrystalline propylene-alpha olefin copolymers containing propylene crystallinity are used as a nucleating agent in crystalline polypropylene and polypropylene copolymers. The nucleating copolymers are propylene-alpha olefin copolymers having a percent crystallinity of 5-75%, a melting point of 45° C.-105° C., and an MFR between 300 and 5000 g/10 min. Nucleated polypropylene compositions comprise a nucleating amount of the copolymer blended in a matrix of polypropylene homopolymer, or 0.01 to 9 wt % α-olefin copolymer, having a melting point greater than 110° C. The nucleating copolymer improves processing time with little or no effect on the crystallinity-associated characteristics of the matrix. The invention also provides methods of crystallizing polypropylene with the nucleating agent and of forming articles with the composition, and also provides articles formed from the composition and/or by the method.

16 Claims, 2 Drawing Sheets

ISOTACTIC POLYPROPYLENE NUCLEATION

PRIORITY CLAIM

This application claims the benefit of and priority to provisional U.S. application Ser. No. 60/922,463 filed Apr. 9, 2007.

FIELD OF THE INVENTION

The invention relates to the crystallization of isotactic polypropylene (iPP) with a class of semi-crystalline propylene copolymers, and also relates to a method of crystallizing iPP and to an iPP composition nucleated with the copolymers.

BACKGROUND OF THE INVENTION

Polypropylene has a variety of properties desirable in a number of applications such as nonwoven fabrics, fibers, films and injection molded articles, including stiffness, toughness, chemical resistance, and heat resistance. Copolymerizing α-olefins with propylene and blending polypropylene with copolymers have broadened polypropylene applications where polypropylene homopolymers were limited by poor physical properties such as impact resistance or toughness.

The goal to decrease stiffness and gain flexibility or softness is hindered by the inherently lower crystallinity and slow crystallization of the copolymer or blends of isotactic polypropylene (iPP) with amorphous elastomers. Nucleating agents increase the rate at which nucleation events occur, often enabling significant crystallization at temperatures higher than possible in the absence of such an agent. However, the addition of conventional nucleating agents to shorten processing times has also generally increased crystallinity and thus increased the stiffness of the polymer article. There is a need for a nucleating agent that enhances the crystallization rate of a propylene based polymer with minimal if any change of crystallinity and the properties governed by crystallinity, such as, for example, modulus and impact resistance.

U.S. Pat. No. 6,747,114 describes an adhesive composition that can include a semi-crystalline, preferably random, copolymer of propylene and at least one comonomer selected from the group consisting of ethylene and at least one $C_4$ to $C_{20}$ α-olefin.

U.S. Pat. No. 6,635,715 describes thermoplastic polymer blend compositions comprising an isotactic polypropylene component and an α-olefin/propylene copolymer component, said copolymer comprising crystallizable α-olefin sequences.

Other background references include US 2007/0240605 (also published as EP 1778781 and WO 06020309), U.S. Pat. No. 4,645,792; U.S. Pat. No. 4,749,736; Bourland, Polymer Preprints (American Chemical Society, Division of Polymer Chemistry) 28(2), 385-7 (1987); Bourland, Plastics Engineering (Brookfield, Conn., United States), 43(7), 39-41 (1987); Pospisil, Journal of Materials Science Letters, 9(4), 495-6 (1990); Janimak, Polymer Bulletin (Berlin, Germany), 22(1), 95-101 (1989).

SUMMARY OF THE INVENTION

We have discovered that certain low molecular weight semicrystalline propylene-alpha olefin copolymers, where the alpha olefin is ethylene or $C_4$ to $C_{20}$, hereinafter referred to as the nucleating polymer component (NPC), show a surprising and unexpected tendency to nucleate the crystallization of isotactic polypropylene (iPP) and polypropylene copolymers, hereinafter referred to as the matrix. These NPC's contain isotactic propylene crystallinity, and are preferably produced in the presence of a metallocene catalyst and an activator in a single steady state reactor. Contacting the matrix through melt blending or other means with the NPC can effect an increase in the number of nucleation events and an acceleration of the overall rate of crystallization of the polymer matrix. The properties of the resulting polymer blends show surprising differences relative to conventional nucleated polymer blends. In particular, for a soft iPP-based matrix, the present invention can increase the rate of nucleation without greatly affecting the level of crystallinity within the matrix.

In one embodiment, the present invention provides a nucleated polypropylene composition comprising: (i) a matrix having a melting point greater than about 110° C. and comprising polypropylene selected from the group consisting of isotactic propylene homopolymers, random copolymers of propylene and an α-olefin, wherein the copolymerized α-olefin content is between 0.01 and 9 percent by weight of the matrix, and mixtures thereof, and (ii) mixed therewith a nucleating amount of an NPC comprising a propylene-alpha olefin copolymer of 65 to 95 percent by weight of the of propylene derived units, and having a percent crystallinity of from 5% to about 75%, a melt flow rate per ASTM D 1238 at 230° C. (MFR) between 300 g/10 min to 5000 g/10 min, and less than 1000 ppm by weight of residues of a molecular degradation agent.

In an embodiment, the blend of the matrix and the NPC can include less than 15 percent by weight of the composition of the NPC, preferably from about 2 to less than 5 percent by weight of the composition of the NPC.

In an embodiment, the NPC can have a melting point between 25° C. and 110° C., a heat of fusion from 5 to 75 J/g, a tacticity index (m/r) from 4 to 12, a molecular weight distribution Mw/Mn between 1.5 and 40, or any combination thereof.

In another embodiment, the NPC can have a proportion of inversely inserted propylene units greater than 0.5%, based on 2,1 insertion of propylene monomer in all propylene insertions; and a proportion of inversely inserted propylene units greater than 0.05%, based on 1,3 insertion of propylene monomer in all propylene insertions.

In one embodiment, the matrix can include a heterogeneous blend of iPP with rubbers and elastomers.

In one embodiment, the matrix can include random copolymer of propylene and α-olefin, wherein the copolymerized α-olefin comprises between 2 and 9 percent by weight of the matrix.

In an embodiment, the composition can include a plasticizer.

Another embodiment of the invention provides an article comprising the nucleated polypropylene composition described above.

A further embodiment of the invention relates to an nucleated polypropylene composition comprising: (i) a matrix having a melting point greater than about 110° C., and comprising polypropylene selected from the group consisting of isotactic propylene homopolymers, random copolymers of propylene and an α-olefin, wherein the copolymerized α-olefin in the copolymers is between 2 and 9 percent by weight of the matrix, and mixtures thereof, wherein the matrix has isotactic propylene sequences; and (ii) mixed therewith from 2 to less than 15 percent by weight of the nucleated polypropylene composition of an NPC comprising a propylene-alpha olefin copolymer having propylene derived units in a proportion of from 65 to 95 percent by weight of the NPC, and having a percent crystallinity of from 5% to about 75%, an MFR between 300 g/10 min to 5000 g/10 min, and less than 1000 ppm by weight of residues from a molecular degradation agent, wherein the NPC is made with a polymerization catalyst which forms iPP.

Still further, an embodiment of the invention includes a method of nucleating an iPP composition. The method includes melt mixing (i) a matrix having a melting point greater than about 110° C. and comprising polypropylene selected from the group consisting of isotactic propylene homopolymers, random copolymers of propylene and an α-olefin, wherein the copolymerized α-olefin is between 0.01 and 9 percent by weight of the primary polypropylene component, and mixtures thereof, and (ii) a nucleating amount of an NPC comprising a propylene-alpha olefin copolymer having 95 to 65 wt % of propylene derived units and having a percent crystallinity of from 5% to about 75%, an MFR between 300 g/10 min to 5000 g/10 min, and less than 1000 ppm by weight of reaction products arising from the chemical reaction of a molecular degradation agent. The method can also include cooling the mixture from the melt to a temperature below the peak crystallization point to initiate crystallization.

In an embodiment of the method, the crystallization onset can be at a temperature above the melting point of the NPC.

Another embodiment of the method relates to forming the melt mixture into a shaped article and maintaining the shape through the cooling. In an embodiment, the forming can include introducing the melt mixture into a mold, wherein the cooling of the article occurs in the mold, and removing the cooled article from the mold.

In an embodiment of the method, the matrix can have an MFR less than 10 g/10 min.

In an embodiment of the method, the NPC can have a crystallinity of 25% to 75% from iPP sequences.

In an embodiment of the method, the matrix can have isotactic propylene sequences and the NPC can be made with a polymerization catalyst which forms iPP.

In an embodiment of the method, the melt can include less than 5 percent by weight of the composition of the NPC, preferably from about 2 to less than 5 percent by weight of the melt of the NPC.

In an embodiment of the method, the NPC can have one or more of the following characteristics: a melting point between 25° C. and 160° C.; a heat of fusion from 10 to 125 J/g; a tacticity index (m/r) from 4 to 12; a reactivity ratio product $r_1 r_2$ of less than 1.5; and a molecular weight distribution Mw/Mn between 1.5 and 40; a proportion of inversely inserted propylene units greater than 0.5%, based on 2,1 insertion of propylene monomer in all propylene insertions; and a proportion of inversely inserted propylene units greater than 0.05%, based on 1,3 insertion of propylene monomer in all propylene insertions.

In one embodiment of the method, the matrix can include a heterogeneous blend of iPP with rubbers and elastomers.

In one embodiment of the method, the matrix can include a random copolymer of propylene and α-olefin, wherein the copolymerized α-olefin comprises between 2 and 9 percent by weight of the primary polypropylene component.

In an embodiment of the method, the melt can further include a plasticizer.

In one embodiment, the invention relates to a method of forming an article from an iPP composition comprising: (A) melt mixing (i) a matrix having a melting point greater than about 110° C., and comprising polypropylene selected from the group consisting of isotactic propylene homopolymers, random copolymers of propylene and an α-olefin, wherein the copolymerized α-olefin in the copolymers is between 2 and 9 percent by weight of the matrix, and mixtures thereof, wherein the matrix has isotactic propylene sequences, and (ii) from 1 to less than 15 percent by weight of the melt mixture of an NPC comprising a copolymer of alpha olefin and propylene containing propylene derived units in a proportion of from 95 to 65 percent by weight of the NPC and having a percent crystallinity of from 5% to about 75%, an MFR between 300 g/10 min to 5000 g/10 min, and less than 1000 ppm by weight of residues from a molecular degradation agent, wherein the NPC is made with a polymerization catalyst which forms iPP; (B) introducing the melt mixture into a mold comprising a shape of an article; (C) cooling the mixture from the melt in the mold to a temperature below the peak crystallization point of the matrix to initiate crystallization onset, wherein the crystallization onset is at a temperature above the melting point of the NPC; and (D) removing the article from the mold.

Another embodiment of the invention relates to an article obtained by nucleating an iPP composition according to the methods described above.

DETAILED DESCRIPTION OF THE INVENTION

This invention relates to the use of a polypropylene-nucleating polymer, referred to herein as the nucleating polymer component (NPC), comprising a low molecular weight propylene dominated copolymer which contains less than 1000 ppm residues derived from molecular degradation agents. The NPC is used in blends with crystalline polypropylene and polypropylene copolymers with ethylene or α-olefins, herein referred to as the matrix, for increasing the nucleation rate of the polymer blend with respect to the matrix alone. In an embodiment relating to the blends of the aforementioned NPC and polypropylene, the present invention provides a blend composition including the NPC blended in a crystallization-promoting proportion with the matrix. The matrix preferably includes isotactic polypropylene (iPP).

Another embodiment of the invention is directed to a process for preparing the blends of the matrix and the NPC. The process can include melt mixing (i) the matrix, and (ii) a nucleating amount of the NPC, and cooling the mixture from the melt to a temperature below the peak crystallization point of the matrix to initiate crystallization onset. Crystallization onset can preferably occur at a temperature above the melting point of the NPC. Crystallization onset can occur at a higher temperature in the melt of the matrix and the NPC than in the corresponding melt of the matrix only without the NPC, or alternatively or additionally, crystallization proceeds following onset at a faster rate than in the melt of the matrix and the NPC than in the corresponding melt of the matrix only without the NPC.

Embodiments of the invention are also directed to a process for preparing fabricated articles from the thermoplastic polymer melt. The melt mixture described above is formed into a shaped article and the shape maintained through the cooling and crystallization. The forming of the thermoplastic article can include casting, blowing, injection molding, extrusion, rotomolding or compression molding as described in the art. In one embodiment, the forming can include introducing the melt mixture into a mold, wherein the cooling of the article occurs in the mold, and removing the cooled article from the mold. The process can if desired also include annealing the resulting article for a period of time less than 20 days at a temperature not to exceed 170° C., preferably at a temperature below the melting point of the matrix, and/or orienting the article either uniaxially or biaxially by extension to not greater than 700% of its original dimension. The annealing and/or the orientation may be conducted in a single operation or as distinctive sequential operations.

A preferred blend according to embodiments comprises a compositional range of the NPC from a lower limit of at least 0.1, 0.5, 1, 1.5, or 2 percent by weight to an upper limit of less than 20, 10, 8, 6, 5, 4, 3.5 or 3 percent by weight, based on the total weight of the blend of the NPC and the matrix, or any range from any lower limit to any upper limit.

The preparation of iPP based compositions which are simultaneously both soft or flexible due to inherently lower crystallinity on one hand, and readily and rapidly processable, e.g. by molding, without appreciably increasing crystallinity on the other hand, has been a challenge. The blends of the matrix and the NPC of the current invention are tough and soft while still having an enhanced rate of crystallization for rapid processing.

As used herein, "soft" refers to blend compositions with a flex modulus (1% secant) of less than 310 MPa (45 kpsi). Preferred soft blends preferably have a flex modulus (1% secant) of less than 241 MPa (35 kpsi), preferably less than 172 MPa (25 kpsi) and even more preferably less than 103 MPa (15 kpsi). The blends of this invention are preferably soft, e.g. have a flex modulus (1% secant) of less than 310 MPa (45 kpsi), preferably less than 241 MPa (35 kpsi), preferably less than 172 MPa (25 kpsi) and even more preferably less than 103 MPa (15 kpsi).

A preferred blend according to embodiments comprises an effective range of the NPC in the matrix such that the ratio of the flexural modulus (1% secant) of the blend versus the same matrix without the NPC (Matrix+NPC/Matrix) is greater than 0.70, preferably greater than 0.75, preferably greater than 0.8 and preferably greater than 0.9 and is less than 3.0, preferably less than 2.0, preferably less than 1.5 and preferably less than 1.2.

As used herein, "enhanced rate of crystallization" indicates that a ratio of the half life of crystallization (in minutes) for the blend of the NPC and the matrix compared to the matrix alone, as measured by DSC at any temperature more than 20° C. below the peak crystallization temperature of the matrix, is less than 1 or less than 0.9 or less than 0.8 or less than 0.5 or less than 0.3.

The matrix can include iPP homopolymer, or isotactic random copolymer of propylene (RCP) wherein the percentage of the copolymerized ethylene and α-olefin in the RCP is between a lower limit of from about 0.01, 0.5 or 2 percent by weight of the RCP up to an upper limit of about 9 percent by weight of the RCP, or a mixture of iPP homopolymer and RCP.

In one embodiment, the matrix component of the present invention is predominately crystalline, i.e., it has a melting point (as measured by DSC as described below) generally greater than about 110° C., preferably greater than about 115° C., and most preferably greater than about 130° C. Preferably, it has a heat of fusion (as measured by DSC as described below) greater than 75 J/g. It is understood that in the context of the embodiments of the invention, the MFR of the matrix is less than 200 g/10 min, less than 150 g/10 min, less than 100 g/10 min, less than 75 g/10 min. less than 50 g/10 min, less than 30 g/10 min, less than 20 g/10 min or preferably less than 10 g/10 min or less than 5 g/10 min or less than 3 g/10 min or less than 2 g/10 min.

In a further embodiment, the matrix can vary widely in composition. For example, the propylene copolymer can contain equal to or less than about 10 weight percent of another monomer. Further, the polypropylene can be present in the form of a graft or block copolymer, in which the blocks of polypropylene have substantially the same stereoregularity as the NPC, so long as the graft or block copolymer has a melting point above about 110° C., preferably above 115° C., and more preferably above 130° C., characteristic of the stereoregular propylene sequences. When the matrix includes RCP, the percentage of the copolymerized α-olefin in the RCP is, in general, from about 0.5% to about 9% by weight of the RCP, preferably about 2% to about 8% by weight of the RCP, most preferably about 2% to about 6% by weight of the RCP.

The α-olefins in the propylene matrix according to an embodiment, contain either 2 or from 4 to about 20 carbon atoms, preferably 2 or from 4 to about 12 carbon atoms. One or two or more α-olefins can be copolymerized with propylene. Exemplary α-olefins may be selected from the group consisting of ethylene; butene-1; pentene-1; 3-methylbutene-1; hexene-1; 2-methylpentene-1; 3-methylpentene-1; 4-methylpentene-1; 3,3-dimethylbutene-1; heptene-1; 3-methylhexene-1; dimethylpentene-1; trimethylbutene-1; ethylpentene-1; methylethylbutene-1; octene-1; ethylhexene-1; dimethylhexene-1; trimethylpentene-1; methylethylpentene-1; propylpentene-1; diethylbutene-1; nonene-1; decene-1; methylnonene-1; ethyloctene-1; dimethyloctene-1; trimethylheptene-1; diethylhexene-1; dodecene-1; hexadodecene-1; and the like.

The matrix can be prepared in an embodiment by polymerizing propylene or a mixture of propylene and one or more monomers selected from $C_2$ and $C_4$-$C_{20}$ α-olefins in the presence of a polymerization catalyst wherein a substantially isotactic propylene polymer containing at least 90% by weight polymerized propylene is obtained. Polymerization methods include high pressure, slurry, gas, bulk, or solution phase, or a combination thereof, using a traditional Ziegler-Natta catalyst or a single-site, metallocene catalyst system. The catalyst used is preferably one which has a high isospecificity. Prochiral catalysts suitable for the preparation of crystalline and semi-crystalline polypropylene copolymers include those described in U.S. Pat. Nos. 5,145,819; 5,304,614; 5,243,001; 5,239,022; 5,329,033; 5,296,434; 5,276,208; 5,672,668; 5,304,614; and 5,374,752; and EP 549 900 and 576 970. Additionally, metallocenes such as those described in U.S. Pat. No. 5,510,502 are suitable for use in this invention. Polymerization may be carried out by a continuous or batch process and may include use of chain transfer agents, scavengers, or other such additives as deemed applicable.

The matrix component may also contain additives such as flow improvers, conventional nucleators, and antioxidants which are normally added to iPP to improve or retain properties.

In one embodiment, the matrix can include an elastomer heterogeneously dispersed within matrix component, preferably in particles less than 10 µm in diameter, commonly known in the art as thermoplastic olefins (TPO), impact copolymer (ICP) and thermoplastic vulcanizates (TPV). Commercially available examples of TPV's include those sold under the trade designations SANTOPRENE, UNIPRENE, NEXPRENE and VEGAPRENE. Commercially available examples of TPO's include those sold under the trade designations SOFTELL, ADFLEX and CATALLOY. The composition limitation of the matrix in this embodiment refers only to the iPP or isotactic RCP matrix portion of the blend.

The mechanism by which the desirable nucleation and crystallization and other characteristics of the present blends are obtained is not fully understood. However, it is believed to involve a co-crystallization phenomenon between propylene sequences of similar stereoregularity in the various polymeric components. However, the intimate blending of the polymers having the required crystallinity characteristics apparently results in a crystallization phenomenon that does not undesirably modify the other physical properties of the propylene/ethylene copolymer, thus measurably increasing its commercial utility and range of applications.

The NPC comprises, in one embodiment, a crystallizable copolymer of propylene and alpha olefin where the alpha olefin is $C_2$ or $C_4$ to $C_{20}$. In one embodiment the invention relates to an NPC comprising a low molecular weight propylene α-olefin copolymer which has some or all of the following features:

(1) a melting point (as measured by DSC as described below) ranging from an upper limit of less than 110° C., or less than 90° C., or less than 80° C., or less than 70° C., to a lower limit of greater than 25° C., or greater than 35° C., or greater than 40° C., or greater than 45° C.;

(2) an mm triad tacticity index of three propylene units (also referred to as the "triad tacticity index") as determined by carbon-13 nuclear magnetic resonance ($^{13}C$ NMR) of greater than 75%, or greater than 80%, or greater than 85%, or greater than 90%;

(3) a heat of fusion ranging from a lower limit of greater than 5 joule per gram (J/g), or greater than 10 J/g, or greater than 25 J/g, or greater than 40 J/g, to an upper limit of less than 125 J/g, or less than 100 J/g, or less than 75 J/g, or less than 60 J/g, or less than 50 J/g, or less than 40 J/g, or less than 30 J/g, or from any lower limit to any higher upper limit;

(4) a tacticity index m/r ranging from a lower limit of 4 or 6 to an upper limit of 8 or 10 or 12;

(5) a proportion of inversely inserted propylene units based on 2,1 insertion of propylene monomer in all propylene insertions, as measured by $^{13}C$ NMR, of greater than 0.5% or greater than 0.6%;

(6) a proportion of inversely inserted propylene units based on 1,3 insertion of propylene monomer in all propylene insertions, as measured by $^{13}C$ NMR, of greater than 0.05%, or greater than 0.06%, or greater than 0.07%, or greater than 0.08%, or greater than 0.085%;

(7) a reactivity ratio product $r_1 r_2$ of less than 1.5, or less than 1.3, or less than 1.0, or less than 0.8;

(8) a molecular weight distribution Mw/Mn ranging from a lower limit of 1.5 or 1.8 to an upper limit of 40 or 20 or 10 or 5 or 3;

(9) a melt flow rate (MFR) per ASTM D 1238 at 230° C. (2.16 kg) of greater than 250 g/10 min, greater than 300 g/10 min, greater than 400 g/10 min, greater than 500 g/10 min, greater than 600 g/10 min, greater than 750 g/10 min, greater than 1000 g/10 min, greater than 1300 g/10 min, greater than 1600 g/10 min, greater than 2000 g/10 min and/or less than 7500 g/10 min, less than 6500 g/10 min, less than 5500 g/10 min, less than 4500 g/10 min, less than 3000 g/10 min and less than 2500 g/10 min;

(10) the NPC is made in the presence of a bridged metallocene catalyst, in a single steady-state reactor;

(11) the NPC contains less than 10000 ppm, less than 5000 ppm, less than 3000 ppm, less than 2000 ppm, or less than 1000 ppm, or less than 500 ppm, or less than 250 ppm by weight of the NPC of residues of a molecular degradation agent; and (12) a percent crystallinity of from 5 to 75%, preferably 10 to 75%, preferably from 15 to 75%, preferably from 20 to 70%, preferably from 25 to 70% (as determined by the DSC method described below).

The NPC can include in one embodiment an alpha olefin-propylene copolymer comprised of, by weight of the NPC, 65 to 95 weight percent propylene derived units, and having a crystallinity of from 15% to about 75% from iPP sequences, a melting point of from 45° C. to 105° C., an MFR between 300 g/10 min to 5000 g/10 min, and less than 1000 ppm by weight of residues from a molecular degradation agent.

Ethylene and the higher olefins are collectively referred to as α-olefins in this disclosure; higher α-olefins are understood to contain from 4 to 20 carbon atoms such as butene, hexene or octene.

In the NPC, the length and distribution of stereoregular propylene sequences are consistent with substantially random statistical copolymerization. It is well known that sequence length and distribution are related to the copolymerization reactivity ratios. A substantially random copolymer is a copolymer for which the product of the reactivity ratios is 2 or less.

The NPC has stereoregular propylene sequences long enough to crystallize. These stereoregular propylene sequences of the NPC may match the stereoregularity of the propylene in the matrix. For example, in an embodiment the matrix is predominantly iPP, and the NPC includes copolymers having isotactic propylene sequences, preferably crystallizable propylene sequences. It is believed that this matching of stereoregularity increases the compatibility of the components and results in improved efficacy in the nucleation process. These characteristics of the NPC are preferably achieved by polymerization with a chiral catalyst. In a preferred embodiment, the preferred NPC has isotactic stereoregular propylene crystallinity. The term "stereoregular" as used herein means that the predominant number, i.e. greater than 80%, of the propylene residues in the polypropylene exclusive of any other monomer such as ethylene, has the same 1,2 insertion and the stereochemical orientation of the pendant methyl groups is the same, either meso or racemic.

One method to describe the molecular features of a propylene copolymer is monomer sequence distribution. Carbon 13 NMR can be used for this purpose, and can be used to establish diad and triad distribution via the integration of spectral peaks. The reactivity ratio product $r_1 r_2$ is described more fully in *Textbook of Polymer Chemistry*, F. W. Billmeyer, Jr., Interscience Publishers, New York, p. 221 et seq. (1957).

The NPC is made with a polymerization catalyst which forms essentially or substantially iPP when all or substantially all propylene sequences in the primary polypropylene are isotactic. Nonetheless, the polymerization catalyst used for the formation of the NPC will introduce stereo- and regio-errors in the incorporation of propylene. Stereo errors are those where the propylene inserts in the chain with a tacticity that is not isotactic and the orientation of the adjacent methyl groups is not meso. A regio error of one kind in one where the propylene inserts with the methylene group or the methyldiene group adjacent to a similar group in the propylene inserted immediately prior to it. A regio error of another kind is one where a propylene inserts in a 1,3 insertion instead of the more usual 1,2 insertion. Such errors are more prevalent after the introduction of a comonomer in the NPC. Thus, the fraction of propylene in isotactic stereoregular sequences (e.g. triads or pentads) is less than 1 for the NPC and decreases with increasing comonomer content of the NPC. While not wanting to be constrained by this theory, the introduction of these errors in the introduction of propylene, particularly in the presence of increasing amounts of comonomer, are important in the use of these propylene copolymers as the NPC. Notwithstanding the presence of these errors, the NPC is statistically random in the distribution of comonomer.

An ancillary procedure for the description of the tacticity of the propylene units of embodiments of the current invention is the use of triad tacticity. The triad tacticity of a polymer is the relative tacticity of a sequence of three adjacent propylene units, a chain consisting of head to tail bonds, expressed as a binary combination of m and r sequences. It is usually expressed for copolymers of the present invention as the ratio of the number of units of the specified tacticity to all of the propylene triads in the copolymer.

The triad tacticity index (mm fraction) of a propylene copolymer can be determined from a $^{13}$C NMR spectrum of the propylene copolymer as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum can be assigned with reference to *Polymer*, Volume 30, page 1350 (1989). The calculation of the triad tacticity index is outlined in the techniques shown in U.S. Pat. No. 5,504,172 and in US 2006/0247331 (page 18, paragraph [239]-[240]). The NPC of embodiments of our invention have a triad tacticity index of three propylene units, as measured by $^{13}$C NMR, of greater than 75%, 80%, 82%, 85%, or 90%.

Tacticity index (m/r) is determined using Carbon 13 NMR and is described at US 2006/0247331, page 18, paragraph [237].

The insertion of propylene can occur to a small extent by either 2,1 (tail to tail) or 1,3 insertions (end to end), as known in the art. The proportion of the 2,1-insertions to all of the propylene insertions in a propylene copolymer can be calculated by reference to article in the journal *Polymer*, vol. 30, p. 1350 (1989), using the peak-naming method of Carman, et al., *Rubber Chemistry and Technology*, vol. 44, p. 781 (1971), also see K. Soga, *Macromolecular Chemistry Rapid Communication*, vol. 8, p. 305 (1987), and where necessary to separate the peak areas of the Iαβ structures, substituting carbon peaks having the corresponding areas as is known in the art.

The proportion of inversely inserted propylene units of embodiments of the nucleating copolymer of our invention, based on the 2,1-insertion of a propylene monomer in all propylene insertions, as measured by $^{13}$C NMR, is greater than 0.5% or 0.6%. The proportion of inversely inserted propylene units of the nucleating copolymer of embodiments of our invention, based on the 1,3-insertion of a propylene monomer, as measured by $^{13}$C NMR, is greater than 0.05%, 0.06%, 0.07%, 0.08%, or 0.085%.

Molecular weight distribution (MWD) is a measure of the range of molecular weights within a given polymer sample, which can be measured using gel permeation chromatography (GPC), also known as size exclusion chromatography (SEC), a well known technique in the art, using columns packed with porous beads, an elution solvent, and detector to separate polymer molecules of different sizes, as discussed in more detail in, for example, Slade, P. E. Ed., *Polymer Molecular Weights Part II*, Marcel Dekker, Inc., NY, pp. 287-368 (1975); Rodriguez, F., *Principles of Polymer Systems* 3rd ed., Hemisphere Pub. Corp., NY, pp. 155-160 (1989); U.S. Pat. No. 4,540,753; and Verstrate et al., *Macromolecules*, vol. 21, p. 3360 (1988).

In embodiments of our invention, the NPC can have a weight average molecular weight (Mw) of from 10,000 to 50,000, or from 20,000 to 50,000 and a molecular weight distribution (MWD), sometimes also referred to as a polydispersity index (PDI), calculated as Mw/Mn, between a lower limit of 1.5 or 1.8 to an upper limit of 40, 20, 10, 5 or 3. In embodiments, the NPC preferably has an MFR greater than 300 g/10 min, greater than 400 g/10 min, greater than 500 g/10 min, greater than 600 g/10 min, greater than 750 g/10 min, greater than 1000 g/10 min, greater than 1300 g/10 min, greater than 1600 g/10 min, or greater than 2000 g/10 min, and less than 5000 g/10 min, less than 4000 g/10 min, less than 3000 g/10 min or less than 2500 g/10 min.

The process for polymerization of the NPC can include a single stage, steady state polymerization conducted in a well-mixed continuous feed polymerization reactor. The polymerization can be conducted in solution, although other polymerization procedures such as gas phase or slurry polymerization, which fulfill the requirements of single stage polymerization and continuous feed reactors, are contemplated. The continuous, non-batch process, in steady state operation, is exemplified by removal of amounts of polymer made per unit time, being substantially equal to the amount of polymer withdrawn from the reaction vessel per unit time. By "substantially equal" we intend that these amounts, polymer made per unit time, and polymer withdrawn per unit time, are in ratios of one to other, of from 0.9:1; or 0.95:1; or 0.97:1; or 1:1.

The NPC can be prepared by polymerizing a mixture of propylene and one or more other alpha olefins in the presence of a chiral catalyst, wherein a crystallizable copolymer is obtained comprising up to 35% by weight ethylene and/or higher alpha olefin and preferably up to 20% by weight ethylene and/or higher alpha olefin containing isotactically crystallizable propylene sequences, in a single stage or multiple stage reactor. A chiral metallocene catalyst may be used. Generally, without limiting in any way the scope of the invention, one process for the production of the NPC is as follows: (1) liquid propylene is introduced in a stirred-tank reactor which is completely or partly full of liquid comprising the solvent, the NPC as well as dissolved, unreacted monomer(s) and catalyst components, (2) the catalyst system is introduced via nozzles in either the vapor or liquid phase, (3) feed ethylene gas and any higher α-olefins are introduced either into the vapor phase of the reactor, or sparged into the liquid phase as is well known in the art, (4) the reactor contains a liquid phase composed substantially of propylene, together with dissolved ethylene and/or higher alpha olefin, and a vapor phase containing vapors of all monomers, (5) the reactor temperature and pressure may be controlled via reflux of vaporizing propylene (autorefrigeration), as well as by cooling coils, jackets, etc., (6) the polymerization rate is controlled by the concentration of catalyst, temperature, and (7) the ethylene and/or higher alpha olefin content of the polymer product is determined by the ratio of ethylene and/or higher alpha olefin to propylene in the reactor, which is controlled by manipulating the relative feed rates of these components to the reactor.

For example, a typical polymerization process consists of a polymerization in the presence of a catalyst comprising a chiral bis (cyclopentadienyl) metal compound and either: 1) a non-coordinating compatible anion activator or 2) an alumoxane activator. An exemplary catalyst system is described in U.S. Pat. No. 5,198,401. The alumoxane activator is preferably utilized in an amount to provide a molar aluminum to metallocene ratio of from about 1:1 to about 20,000:1 or more. The non-coordinating compatible anion activator is preferably utilized in an amount to provide a molar ratio of biscyclopentadienyl metal compound to non-coordinating anion of 10:1 to about 2:3. The above polymerization reaction is conducted by reacting such monomers in the presence of such catalyst system at a temperature of from about −50° C. to about 200° C. for a time of from about 1 second to about 10 hours to produce a copolymer or terpolymers having an MFR between 300 g/10 min and 5000 g/10 min and a PDI from about 1.8 to about 4.5.

While the process of the present invention includes utilizing a catalyst system in the liquid phase, e.g. slurry, solution, suspension or bulk phase or combination thereof, gas phase polymerization can also be utilized. When utilized in a gas phase, slurry phase or suspension phase polymerization, the catalyst systems will preferably be supported catalyst systems as described in U.S. Pat. No. 5,057,475, for example, and can also include other well-known additives such as, for example, scavengers as described in U.S. Pat. No. 5,153,157. Suitable catalysts and catalyst systems are described, for example, in U.S. Pat. Nos. 4,542,199, 4,543,399, 4,588,790, 4,752,597, 4,808,561, 4,871,705, 4,897,455, 4,912,075, 4,937,217, 4,937,301, 5,008,228, 5,017,714, 5,028,670, 5,086,025, 5,120,867, 5,132,262, 5,147,949, 5,198,401, 5,238,892, 5,243,001, 5,278,119, 5,278,264, 5,296,434, 5,304,614, 5,324,800, 5,387,568, 5,391,629, EP-A-0 277 003, EP-A-0 277 004, EP-A-0 426 637, EP-A-0 427 697, EP-A-0 495 375, EP-A-0 520 732, EP-A-0 573 403, WO 97/22639, WO 97/22635, WO 96/08519 and WO 92/00333.

The polymer blends of the present invention have several embodiments. While the above discussion has been limited to the description of the invention in relation to having only a matrix and an NPC, as will be evident to those skilled in the art, the polymer blend compositions of the present invention may comprise other additives. Various additives may be present to enhance a specific property or may be present as a result of processing of the individual components. The additives described herein are not intended to be inclusive of all types of additives which may be employed with the present invention. As is understood by the skilled in the art, the polymer blend compositions of the present invention may be modified to adjust the characteristics of the blend as desired.

Additives which may be incorporated include, for example, fire retardants, antioxidants, plasticizers, pigments, vulcanizing or curative agents, vulcanizing or curative accelerators, cure retarders, processing aids, flame retardants, tackifying resins, and the like. These compounds may include fillers and/or reinforcing materials. These include carbon black, clay, talc, calcium carbonate, mica, silica, silicate, combinations thereof, and the like. Other additives which may be employed to enhance properties include antiblocking agents and coloring agent. Further, conventional nucleating agents or nucleating modification agents may be employed in combination with the NPC according to the present invention. Fillers and nucleating agents tend to improve rigidity of the article.

Embodiments of the blends of the invention can contain inorganic particulate fillers. The inorganic particulate fillers are used to improve the mechanical and wear properties of the blends. Typically less than 40 wt %, more preferably less than 30 wt % of the inorganic filler is used in these formulations. The particulate fillers include particles less than 1 mm in diameter, rods less than 1 cm in length and plates less than 0.2 cm² in surface area. Exemplary particulate fillers include carbon black, clays, titanium and magnesium oxides, and silica. In addition, other particulate fillers such as calcium carbonate, zinc oxide, whiting, and magnesium oxide can also be used. Examples of useful rod like filler are glass fibers. Examples of useful plate like fillers are mica. The addition of very small particulate fillers, commonly referred to as organoclays, nanoclays or nanocomposites, is also contemplated in this invention.

In a preferred embodiment, the blend can contain 1% by weight or more of particulate filler, more preferably 2% by weight or more, even more preferably 3% by weight or more, most preferably 4% by weight or more. Typically, the composition contains 40% by weight or less of particulate filler, more preferably 35% by weight or less, even more preferably 30% by weight or less, most preferably 25% by weight or less.

Lubricants, mold release agents, reinforcements, and fillers (including granular, fibrous, or powder-like) may also be employed. It is understood in the context of the embodiments of the invention that the polymer blend may contain a plasticizer or added process oil. The process oil may consist of paraffinic oils, aromatic oils, oligomeric esters and ethers as well as any other plasticizer commonly used for polyolefin compounds. In one embodiment the plasticizer is a process oil. The addition of process oil in moderate amounts lowers the viscosity and flexibility of the blend while improving the properties of the blend at temperatures near and below 0° C., which are believed to arise by the lowering of the $T_g$ of the blend. Additional benefits of adding plasticizer to the blends can include improved processability and a better balance of elastic and tensile strength. In another embodiment, plasticizers such as those described as non-functional plasticizers (NFP's) in WO 04/014998 at pages 9, line 31 to page 28, line 7, particularly pages 16 line, 14 to page 20, line 17) are added to the compositions of this invention. Preferred plasticizers include polyalphaolefin (PAO) liquids, present at from 0.1 to 50 wt % (based upon the weight of the blend), with a pour point (as measured by ASTM D 97) of 0° C. or less, preferably −10° C. or less, more preferably −20° C. or less, more preferably −25° C. or less, a kinematic viscosity at 100° C. (measured by ASTM D 445) of 3 cSt or more, preferably 5 cSt or more, more preferably 10 cSt or more, and, optionally, a flash point (as measured by ASTM D 56) of 200° C. or more, preferably 210° C. or more, preferably 220° C. or more, and, optionally, a viscosity index (as determined by ASTM D2270) of 100 or more, preferably 120 or more, preferably 140 or more, and optionally a specific gravity (15.6/15.6° C.) of 0.86 or less (preferably 0.855 or less, preferably 0.85 or less, preferably 0.84 or less, as determined by ASTM D 4052). PAO liquids are described in, for example, U.S. Pat. No. 3,149,178; U.S. Pat. No. 4,827,064; U.S. Pat. No. 4,827,073; U.S. Pat. No. 5,171,908; and U.S. Pat. No. 5,783,531 and in SYNTHETIC LUBRICANTS AND HIGH-PERFORMANCE FUNCTIONAL FLUIDS (Leslie R. Rudnick & Ronald L. Shubkin, ed. Marcel Dekker, Inc. 1999), p. 3-52.

The process of blending of the present invention may include blending by any procedure that provides an intimate mixture of the components. For example, the components can be combined by melt pressing the components together on a Carver press to a thickness of about 0.5 millimeter (20 mils) and a temperature of about 180° C., rolling up the resulting slab, folding the ends together, and repeating the pressing, rolling, and folding operation about 10 times. Internal mixers are particularly useful for melt blending. Blending at a temperature of about 180° C. to 240° C. in a BRABENDER PLASTOGRAPH unit for about 1 to 20 minutes has been found satisfactory. Still another method involves blending the polymers in a BANBURY internal mixer above the flux temperature of all of the components, e.g., 180° C. for about 5 minutes. Continuous mixing may also be used. These processes are well known in the art and include single and twin screw mixing extruders, static mixers for mixing molten polymer streams of low viscosity, impingement mixers, as well as other machines and processes, designed to disperse the NPC and the matrix in intimate contact. The polymer blends of the instant invention exhibit a remarkable combination of desirable physical properties and quickly form crystalline solids.

According to yet another embodiment the plasticizer is an amorphous polymer of propylene or a copolymer of propylene and another α-olefin and is formed concurrently with the NPC by the addition of second catalysts to that polymerization process which allows the co-production of an atactic and amorphous copolymer.

The blends of the instant invention preferably have a flex modulus (1% secant) of less than 310 MPa (45 kpsi), preferably less than 241 MPa (35 kpsi), preferably less than 172 MPa (25 kpsi) and even more preferably less than 103 MPa (15 kpsi) as measured by the methods described below. The blends of the instant invention preferably have one or more of the following properties:

a) a $t_{1/2}$ of 10 minutes or less, preferably 6 minutes or less, preferably 5 minutes or less, preferably 3 minutes or less, preferably 1 minute or less as measured by the methods described below;
b) a Tensile Strength of 12 to 1 MPa, preferably 10 to 2 MPa, more preferably 7 to 2 MPa or more as measured by the methods described below;
c) a percent elongation at break of 1200 to 20%, preferably 1000 to 200%, more preferably 800 to 200% as measured by the methods described below;
d) a Tm of 180 to 110° C., preferably 170 to 125° C., more preferably 165 to 130° C. as measured by the methods described below;
e) a heat of fusion of 195 to 15 J/g, preferably 140 to 20 J/g, more preferably 90 to 20 J/g as measured by the methods described below;
i) a melt flow rate (ASTM 1238, 230° C.) of 500 to 0.05 dg/min, preferably 100 to 0.5 dg/min, more preferably 80 to 0.8 dg/min.

A particularly preferred blend comprises an effective range of the NPC in the matrix such that the ratio of flexural modulus (1% secant) of the blend compared to the same matrix without NPC (matrix+NPC/matrix) is greater than 0.70, preferably greater than 0.75, preferably greater than 0.8 and preferably greater than 0.9 and is less than 3.0, preferably less than 2.0, preferably less than 1.5 and preferably less than 1.2, and the ratio of the half time of crystallization (in minutes) for the blend of the NPC and the matrix compared to the same matrix without NPC (matrix+NPC/matrix), as measured by DSC at 20° C. lower than the melting point of the matrix, is less than 1 or less than 0.9 or less than 0.8 or less than 0.5 or less than 0.3.

In a preferred embodiment, the crystallization onset (rheometer) of the inventive blends described herein occurs at a temperature at least 20° C. above the melting point of the NPC, preferably at least 15° C. above the melting point of the NPC, at least 10° C. above the melting point of the NPC, alternately at least 5° C. above the melting point of the NPC.

In another preferred embodiment, the crystallization onset (by DSC) of the inventive blends described herein occurs at a temperature at least 10° C. above the crystallization onset of the matrix (as determined by DSC), preferably at least 6° C. above the crystallization onset of the matrix, at least 4° C. above the crystallization onset of the matrix alone in the absence of the NPC.

The blends of the instant invention may be fabricated into injection molded objects, sheets, cast and blown films and rotomolded or slush molded articles by processes well known in the art.

In further embodiments, this invention relates to:
1. A nucleated polypropylene composition comprising;
   a. a matrix having a melting point greater than about 110° C. and comprising polypropylene selected from the group consisting of isotactic propylene homopolymers, random copolymers of propylene and an α-olefin, wherein the copolymerized α-olefin in the copolymers is between 0.01 and 9 percent by weight of the matrix, and mixtures thereof, and
   b. mixed therewith a nucleating amount of a nucleating polymer component comprising a propylene-alpha olefin copolymer of 65 to 95 percent by weight of propylene derived units (based upon the weight of the nucleating polymer component), and having a percent crystallinity of from 5% to about 75%, a melt flow rate between 300 g/10 min to 5000 dg/min, and less than 1000 ppm by weight of residues of a molecular degradation agent;
   wherein the nucleated polypropylene composition has flexural modulus (1% secant) of less than 310 MPa.
2. The nucleated polypropylene composition of paragraph 1, wherein the matrix has an MFR of less than 10 dg/min.
3. The nucleated polypropylene composition of paragraph 1 or 2, wherein the nucleating polymer component has a percent crystallinity of 25% to 75%.
4. The nucleated polypropylene composition of paragraph 1, 2 or 3 wherein the nucleating polymer component further comprises less than 10 wt % of a non-conjugated diene.
5. The nucleated polypropylene composition of paragraph 1, 2, 3 or 4, wherein the nucleating polymer component is made with a polymerization catalyst which forms isotactic polypropylene and the matrix has isotactic propylene sequences.
6. The nucleated polypropylene composition of paragraph 1, 2, 3, 4 or 5, comprising less than 15 percent by weight of the composition of the nucleating polymer component.
7. The nucleated polypropylene composition of any of paragraphs 1 to 6, comprising from about 2 to less than 5 percent by weight of the composition of the nucleating polymer component.
8. The nucleated polypropylene composition of any of paragraphs 1 to 7, wherein the nucleating polymer component has:
   a melting point between 25° C. and 110° C.;
   a heat of fusion from 5 to 75 J/g;
   a tacticity index (m/r) from 4 to 12; and
   a molecular weight distribution Mw/Mn between 1.5 and 40.
9. The nucleated polypropylene composition of any of paragraphs 1 to 8 wherein the nucleating polymer component comprises one or more of the following characteristics:
   a proportion of inversely inserted propylene units greater than 0.5%, based on 2,1 insertion of propylene monomer in all propylene insertions;
   a proportion of inversely inserted propylene units greater than 0.05%, based on 1,3 insertion of propylene monomer in all propylene insertions.
10. The nucleated polypropylene composition of any of paragraphs 1 to 9, wherein the matrix comprises a heterogeneous blend of isotactic polypropylene with rubbers and elastomers.

11. The nucleated polypropylene composition of any of paragraphs 1 to 10, wherein the matrix comprises the random copolymer of propylene and α-olefin, wherein the copolymerized α-olefin comprises between 2 and 9 percent by weight of the primary polypropylene component.
12. The nucleated polypropylene composition of any of paragraphs 1 to 11, further comprising a plasticizer.
13. An article comprising the nucleated polypropylene composition of any of paragraphs 1 to 12.
14. A nucleated polypropylene composition comprising;
   a. a matrix having a melting point greater than about 110° C. and comprising polypropylene selected from the group consisting of isotactic propylene homopolymers, random copolymers of propylene and an α-olefin, wherein the copolymerized α-olefin in the copolymers is between 2 and 9 percent by weight of the matrix, and mixtures thereof, and
   b. mixed therewith from 2 to less than 15 percent by weight of the nucleated polypropylene composition of a nucleating polymer component comprising an ethylene-propylene copolymer of ethylene derived units in a proportion of from 5 to 35 percent by weight of the nucleating polymer component, a non-conjugated diene in a proportion of from 0 to 10 percent by weight of the nucleating polymer component of propylene derived units in a proportion of from 65 to 95 percent by weight of the crystallization-promoting component, and having a percent crystallinity of from 5% to about 75%, an MFR between 300 g/10 min to 5000 g/10 min, and less than 1000 ppm by weight of residues from a molecular degradation agent, wherein the nucleating polymer component is made with a polymerization catalyst which forms isotactic polypropylene,
wherein the nucleated polypropylene composition has flexural modulus (1% secant) of less than 310 MPa.
15. A method of nucleating an isotactic polypropylene composition comprising;
   a. melt mixing (i) a matrix having a melting point greater than about 110° C. and comprising polypropylene selected from the group consisting of isotactic propylene homopolymers, random copolymers of propylene and an α-olefin, wherein the copolymerized α-olefin in the copolymers is between 0.01 and 9 percent by weight of the matrix, and mixtures thereof, and (ii) a nucleating amount of a nucleating polymer component comprising a propylene-alpha olefin copolymer of 65 to 95 percent by weight of the nucleating polymer component of propylene derived units, and having a percent crystallinity of from 5% to about 75%, a melt flow rate per ASTM D 1238 at 230° C. (MFR) between 300 g/10 min to 5000 g/10 min, and less than 1000 ppm by weight of residues from a molecular degradation agent; and
   b. cooling the mixture from the melt to a temperature below the peak crystallization point to initiate crystallization onset
   c. obtaining a nucleated polypropylene composition having a flexural modulus (1% secant) of less than 310 MPa.
16. The method of paragraph 15, wherein the crystallization onset is at a temperature above the melting point of the nucleating polymer component.
17. The method of paragraph 15 or 16, further comprising forming the melt mixture into a shaped article and maintaining the shape through the cooling.
18. The method of paragraph 17, wherein the forming comprises introducing the melt mixture into a mold, wherein the cooling of the article occurs in the mold, and further comprising removing the cooled article from the mold.
19. The method of paragraph 15, 16, 17 or 18, wherein the matrix has an MFR less than 10 g/10 min.
20. The method of any of paragraphs 15 to 19, wherein the nucleating polymer component has a crystallinity of 25% to 75% from isotactic polypropylene sequences, and is made with a polymerization catalyst which forms isotactic polypropylene.
21. The method of paragraphs 15 to 20, wherein the melt mixture comprises from 2 to less than 5 percent by weight of the melt mixture of the nucleating polymer component.
22. The method of paragraphs 15 to 21, wherein the matrix comprises a heterogeneous blend of isotactic polypropylene with rubbers and elastomers.
23. The method of paragraphs 15 to 22, wherein the matrix comprises the random copolymer of propylene and α-olefin, wherein the copolymerized α-olefin comprises between 2 and 9 percent by weight of the matrix.
24. A method of forming an article from an isotactic polypropylene composition comprising;
   a. melt mixing (i) a primary polypropylene component having a melting point greater than about 110° C. and comprising polypropylene selected from the group consisting of isotactic propylene homopolymers, random copolymers of propylene and an α-olefin, wherein the copolymerized α-olefin in the copolymers is between 2 and 9 percent by weight of the matrix, and mixtures thereof, wherein the matrix has isotactic propylene sequences, and (ii) from 1 to less than 15 percent by weight of the melt mixture of a nucleating polymer component comprising a copolymer of alpha olefin and propylene comprising propylene derived units in a proportion of from 65 to 95 percent by weight of the nucleating polymer component, and having a percent crystallinity of from 5% to about 75%, an MFR between 300 g/10 min to 5000 g/10 min, and less than 1000 ppm by weight of residues from a molecular degradation agent, wherein the nucleating polymer component is made with a polymerization catalyst which forms isotactic polypropylene;
   b. introducing the melt mixture into a mold comprising a shape of an article;
   c. cooling the mixture from the melt in the mold to a temperature below the peak crystallization point of the matrix to initiate crystallization onset, wherein the crystallization onset is at a temperature above the melting point of the nucleating polymer component;
   d. removing the cooled article from the mold.
25. The article obtained from the method of paragraph 24.

EXAMPLES

Compression molding: Approximately 90 g of sample were placed in 20.3 cm×20.3 cm×3.1 mm thick (8 in.×8 in.×0.125 in.) metal frame between two sheets of MYLAR film in a heated press at 204° C. (400° F.). The sample was heated in compression between two metal plates about 1.27 cm (0.5 in.) thick. The sample was preheated for 15 minutes then pressed for 3 minutes at 103 MPa (15,000 psi). The sample was released and cooled under pressure of 13.8 to 34.5 MPa (2000 to 5000 psi) for 4 minutes at 23° C. The pads were removed and aged under controlled temperature and humidity conditions (50% relative humidity, room temperature) for 48 hours before samples of the testing geometry as specified in the test below were removed with a die.

Tensile strength and stress strain values. Samples of the inventive composition were tested were tested according to ASTM D-638, except that the separation of the grips was conducted at 51 cm/min (20 in./min). The extension of the grips and thus the samples was independently determined using an extensometer attached to the testing apparatus. The tensile strength data is reported as psi, the elongation is reported as the % elongation of the distension zone of the sample.

Softness of the nucleating copolymers of embodiments of the invention is measured by flexural modulus. Flexural modulus is measured in accordance with ASTM D790, using a Type IV dogbone at crosshead speed of 1.3 mm/min (0.05 in./min).

MFR: Melt flow rate was determined according to ASTM D-1238-04C at 230° C. and is reported as g/10 min.

Brookfield Viscosity: Melt viscosity was measured according to ASTM D-3236 using a Brookfield Thermosel viscometer at 190° C. and are reported as mPa-s (cp).

DSC Tc, Tm, Delta Hf, crystallization half-time, Hc, % crystallinity: Peak melting point (Tm) in ° C., heat of fusion (Delta Hf in J/g), and peak crystallization point (Tc) in ° C. were determined using the following procedure. Differential scanning calorimetric (DSC) data were obtained using a TA Instruments model 2920 machine. Samples weighing approximately 7-10 mg were molded and sealed in aluminum sample pans. After 48 hours at room temperature (21° C. to 25° C.) the samples were analyzed. The DSC data were recorded by first cooling the sample to −50° C. and then gradually heating it to 200° C. at a rate of 10° C./minute. This sequence of operation was the first heating cycle. The sample was kept at 200° C. for 5 minutes before a cooling cycle was applied at 10° C./minute to −50° C. This was the second cooling cycle. The sample was heated again to 200° C. at a rate of 10° C./minute. This was the second heating cycle. The peak melting point and the heat of fusion were obtained from the second heating cycle. The peak crystallization point was determined from the second cooling cycle. The heat of crystallization (Hc) and crystallization point were determined from the second cooling cycle. The crystallization half-time, $t_{1/2}$, was determined by keeping the sample at 200° C. for 10 minutes before a cooling ramp was applied at 150° C./minute to 148° C. followed by a second cooling ramp at 40° C./minute to the isothermal crystallization temperature, Tx, (e.g., 128° C.). The sample was held at Tx for 45 minutes or until crystallization was complete. The $t_{1/2}$ is the time required to evolve 50% of the total heat flow recorded during isothermal crystallization. The percent crystallinity (X %) of the propylene polymers is calculated using the formula: [area under the curve (in J/g)/189 J/g)]*100.

Rheologically determined crystallization: Crystallization onset time ($t_{c,onset}$) and crystallization onset temperature ($T_{c,onset}$) were measured in a RHEOMETERICS ARES rheometer using 25 mm parallel plate configuration. The temperature was initially raised to 200° C. then either cooled by one of two methods: a) cooled at 1° C./min while applying an oscillatory shear rate of 1 rad/s and 5% strain until crystallization occurred as indicated by a sharp rise in the complex viscosity, or b) rapidly cooled to 135° C. then held isothermal while applying an oscillatory shear rate (1 rad/s and 5% strain) or a constant shear rate of 0.1, 0.5 and 1 s$^{-1}$ until crystallization occurred as indicated by a sharp rise in the complex viscosity. The first method was useful for the determination of crystallization onset temperature $T_{c,onset}$ and the second for isothermal crystallization onset time $t_{c,onset}$ as a function of shear rate. The onset point of the rapid rise in complex viscosity ($\eta^*$) was determined by the intersection of straight line fits of the data from either side of the transition.

Nucleation rate was determined via optical microscopy as the number of nuclei in a crystallizing polymer melt. A thin polymer film was placed on a microscope slide inside a METTLER hotstage. The sample and hotstage were positioned on the microscope between crossed polarizers. The temperature was raised to 220° C. to melt the sample followed by rapid cooling to the isothermal crystallization temperature, Tx, (e.g., 128° C.). The sample was observed until bright spots appeared due to birefringent spherulitic crystalline growth. Images were captured via an attached digital camera and the number of nucleation sites was quantified.

NPC composition: ethylene content was determined by a method designed to measure ethylene content between 5 and 40 wt % ethylene. A thin homogeneous film was pressed according to submethod A of ASTM D-3900, and then mounted on a Perkin Elmer Spectrum 2000 infrared spectrophotometer. A full spectrum was recorded using a resolution of 4.0 cm$^{-1}$ and a spectral range of 4500 to 450 cm$^{-1}$. Ethylene content was calculated by taking the ratio of the propylene band area at 1155 cm$^{-1}$ to the ethylene band area at 732 cm$^{-1}$ ($C_3/C_2$=AR) and applying it to the following equation: Ethylene wt %=82.585−111.987X+30.045X$^2$, where X is the ratio of the peak height at 1155 cm$^{-1}$ and peak height at either 722 cm$^{-1}$ or 732 cm$^{-1}$, whichever was higher.

NPC composition: α-olefin content other than ethylene or propylene was determined using the CNMR technique described in Macromol. Cem. Phys., 201, 401, (2000). The procedure involved collecting a CNMR spectrum on a polymer sample that had been dissolved in tetrachloroethane-d2 and integrating the spectral intensity. The mole percent hexene was determined by calculating the ratio of the peak integrals which correspond to the number of moles of hexene to the number of moles of all monomer in the sample.

Molecular Weight of the NPC by GPC: weight average molecular weight (Mw) and number average molecular weight (Mn) were determined using a WATERS 150 Size Exclusion Chromatograph (SEC) equipped with a differential refractive index detector (DRI), an online low angle light scattering (LALLS) detector (dual-angle light scattering photometer with a 690 nm diode laser light source and 15° and 90° scattered light collection angles, Precision Detector Inc., model 2040) and a viscometer (VIS) (high temperature Model 150R, Viscotek Corporation), with the LALLS detector placed after the columns, followed by the VIS and the DRI. The details of the detector calibrations are described in T. Sun, et al., *Macromolecules*, vol. 34, no. 19, pp. 6812-6820, (2001). Briefly, in both detector configurations, the SEC was provided with three POLYMER LABORATORIES PLgel 10 mm Mixed-B columns, and operated with a nominal flow rate of 0.5 cm$^3$/min, and a nominal injection volume of 300 μL. The various transfer lines, columns and DRI were maintained at 135° C. Only the 15° output from the LALLS was used. Signals were sent to a data acquisition board (National Instruments) that accumulated readings at a rate of 16 per second. The lowest four readings were averaged, and then a proportional signal was sent to the SEC-LALLS-VIS computer.

Solvent was prepared by adding 6 grams of butylated hydroxy toluene (BHT) as an antioxidant to a 4 liter bottle of 1,2,4 trichlorobenzene (TCB) (Aldrich, reagent grade) and waiting for the BHT to dissolve. The TCB mixture was then filtered through a 0.7 μm glass pre-filter and subsequently through a 0.1 μm TEFLON filter. There was an additional online 0.7 μm glass pre-filter/0.22 μm TEFLON filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations used for higher molecular weight samples.

NPC comparative samples used in the examples included a very low molecular weight polypropylene wax (F.1.1), an amorphous, atactic polypropylene having a viscosity of approximately 40,000 mPa-s at 190° C. (F.1.2), and ESCORENE 9302E1 random ethylene-propylene copolymer with 4 wt % ethylene from ExxonMobil Chemical Co, Houston, Tex. (F.1.3). Characteristic properties are listed in Table 1.

TABLE 1

NPC Comparatives

| Sample | Type | Tm (° C.) | Tc (° C.) | Tg (° C.) | delta Hf (J/g) | Viscosity @190° C. (mPa-s) | MFR (g/10 min) |
|---|---|---|---|---|---|---|---|
| F.1.1 | PP Wax | 147.5 | 108.5 | — | 108.1 | 2290 | |
| F.1.2 | Atactic PP | n.o. | n.o. | | 0 | | |
| F.1.3 | RPC | 139.2 | 93.55 | — | 87.76 | | 3 |

Note
n.o. = not obtainable.

NPC synthesis: NPC's for these experiments were obtained as a variety of low molecular weight, propylene dominant polymers of varying degrees of crystallinity. All polymerizations were performed in a liquid filled, single-stage continuous reactor using mixed metallocene catalyst systems. The reactor was a 0.5-liter stainless steel autoclave reactor and was equipped with a stirrer, water cooling/steam heating element with a temperature controller, and a pressure controller. Solvents, propylene, and comonomers (such as hexane and octene) were first purified by passing through a three-column purification system. The purification system consisted of an Oxiclear column (Model # RGP-R1-500 from Labclear) followed by 5A and 3A molecular sieve columns (Aldrich). Purification columns were regenerated periodically whenever there was evidence of lower activity of polymerization. Both the 3A and 5A molecular sieve columns were regenerated in-house under nitrogen at a set temperature of 260° C. and 315° C., respectively. Oxiclear column was regenerated in the original manufacture. The purified solvents and monomers were then cooled in a chiller to about −15° C., mixed in a manifold and fed into the reactor through a single tube.

The catalyst was rac-dimethylsilylbisindenyl haffiium dimethyl (C1), available from Albemarle, or dimethylsilyl bis(2-methyl-4-phenylindenyl) zirconium dimethyl pre-activated with N,N-dimethylanilinium tetrakis (pentafluorophenyl) borate (A1) or dimethylaniliniumtetrakis(octafluoronaphthyl) borate (A2), available form Albemarle, at a molar ratio of about 1:1 in toluene. The catalyst solution was kept in an inert atmosphere with <1.5 ppm water content and was fed into reactor by a metering pump through a separated line. Catalyst and monomer contacts took place in the reactor. As an impurity scavenger, 250 ml of tri-n-octyl aluminum (TNOA) (25 wt % in hexane, Sigma Aldrich) was diluted in 22.83 kg of hexane. The TNOA solution was stored under nitrogen blanket. The solution was used for all polymerization runs until about 90% of consumption, and then a new batch was prepared. Pumping rates of the TNOA solution varied from run to run, ranging from 0 (no scavenger) to 4 ml per minute.

The reactor was first cleaned by continuously pumping solvent and scavenger through the reactor system for at least one hour at about 150° C. After cleaning, the reactor was heated/cooled to the desired temperature using a water/steam mixture flowing through the reactor jacket and controlled at a pressure of about 2.41 MPa (gauge) with controlled solvent flow. Monomers and catalyst solutions were then fed into the reactor when a steady state of operation was reached. An automatic temperature control system was used to control and maintain the reactor at a set temperature. Onset of polymerization activity was determined by observation of a viscous product and lower temperature of water-steam mixture. Once the activity was established and the system reached steady state, the steady state conditions were maintained for a time period of at least five times mean residence time prior to sample collection. The collected samples were dried in a hood, and then in a vacuum oven at about 90° C. for about 12 hours. The dried samples were weighed to obtain yields. Some of the synthesis conditions and NPC properties are listed in Table 2.

TABLE 2

NPC Samples

| NPC Sample | Reactor T (° C.) | C3 Flow (g/min) | C2 Flow (ml/min) | C6 Flow (ml/min) | Catalyst | Tm (° C.) | Tc (° C.) | Tg (° C.) | delta H (J/g) | Viscosity @190° C. (mPa-s) |
|---|---|---|---|---|---|---|---|---|---|---|
| F.2.1 | 80 | 14 | 0.8 | 0 | C1/A1 | 95.42 | 54.32 | −21.75 | 41.77 | 28200 |
| F.2.2 | 75 | 14 | 0.4 | 0 | C1/A1 | 98.19 | 57.47 | −16.85 | 49.24 | 17900 |
| F.2.3 | 75 | 14 | 0.6 | 0 | C1/A1 | 87.96 | 45.68 | −21.6 | 41.31 | 55100 |
| F.2.4 | 90 | 14 | 0 | 1 | C2/A1 | 144.6 | 102.1 | n.o. | 87.37 | 5640 |
| F.2.5 | 65 | 14 | 0 | 8 | C1/A1 | 39.11 | n.o. | −18 | <1 | 9700 |
| F.2.6 | — | — | — | — | — | 57.8 | n.o. | −31.75 | <1 | 67600 |
| F.2.7 | 75 | 14 | 0 | 2 | C1/A2 | 102.9 | 50.3 | −10.53 | 60.56 | 389000 |
| F.2.8 | | | | | C2/A1 | | | | 25 | 7000 |
| F.2.9 | | | | | C2/A1 | 129.7 | 59.3 | n.o. | 78.9 | 3560 |

Note
n.o. = not obtainable,
C1 = dimethylsilylbis(indenyl)hafnium dimethyl;
A1 = N,N-dimethylanilinium tetra(perfluorophenyl)borate;
C2 = dimethylsilyl bis(2-methyl-4-phenylindenyl) zirconium dimethyl;
A2 = dimethylaniliniumtetrakis(octafluoronaphthyl) borate Matrix polymers comprised polypropylene of various molecular weights and crystallinities as denoted below and were obtained from ExxonMobil Chemical Company, Houston, Tex. Matrix polymer S.1 was a Ziegler-Natta homopolymer iPP with MFR of 35 g/10 min obtained under the trade designation ESCORENE PP3155. Matrix polymer S.2 was a non-nucleated reactor grade Ziegler-Natta impact copolymer (ICP) of propylene and ethylene of 60 g/10 min MFR with approximately 10 wt % ethylene obtained under the trade designation 4T4PC20.0. Matrix polymer S.3 was a Ziegler-Natta copolymer of propylene and ethylene of 3 g/10 min MFR with approximately 4 wt % ethylene obtained under the trade designation Escorene PP9302E1. Matrix polymer S.4 was a thermoplastic vulcanizate (TPV) obtained under the trade designation SANTOPRENE 201-64W175. Matrix polymer S.5 was a metallocene propylene elastomer of 8 g/10 min MFR obtained under the trade designation VISTAMAXX VM3000.

Blends of the NPC samples or NPC comparative with the matrix polymers were prepared by adding the polymers together with 750 ppm IRGAFOS 168 and 1200 ppm IRGANOX 1010 to a BRABENDER PLASTOGRAPH and blending for 5-10 minutes at 190° to 200° C. In all subsequent examples compositions of the blend are expressed in grams of each component which are blended together. Proportions of the polymers and the properties in the blends are provided below in Tables 3-19.

TABLE 3

Example 1 Blends

| | 1-1 | 1-2 | 1-3 | 1-4 | 1-5 | 1-6 | 1-7 | 1-8 | 1-9 | 1-10 |
|---|---|---|---|---|---|---|---|---|---|---|
| Blend Composition (parts by weight) | | | | | | | | | | |
| F.2.1 | 0 | 0.56 | 1.68 | 2.76 | 5.42 | 18 | 12.5 | 17.5 | 25 | 37.5 |
| S.1 | 200 | 223.44 | 222.32 | 217.24 | 216.58 | 480 | 200 | 218 | 200 | 200 |
| Blend Properties | | | | | | | | | | |
| $t_{1/2}$ @ 128° C. (min) | 4.046 | 3.824 | 2.963 | 3.632 | 3.006 | 3.72 | 4.083 | 3.52 | 3.297 | 3.597 |
| Delta Hc @ 128° C. (J/g) | −98.18 | −94.39 | −97.49 | −97.23 | −94.01 | −94.02 | −93.94 | −93.34 | −90.42 | −85.87 |
| Tm (° C.) | 162.91 | 162.2 | 162.08 | 161.7 | 168.54 | 161.46 | 162.2 | 160.86 | 163.7 | 160.7 |
| Tc (° C.) | 116.15 | 116.59 | 118.5 | 117.76 | 120.08 | 116.88 | 116.25 | 116.75 | 117.09 | 116.6 |
| Delta Hf (J/g) | 99.82 | 114.98 | 103.46 | 119.92 | 103.77 | 104.85 | 107.62 | 111.61 | 103.6 | 110.55 |
| MFR (g/10 min) | 44.58 | 40.88 | 39.7 | 41.36 | 49 | — | 42.66 | 45.86 | 50.3 | 53.31 |

TABLE 4

Example 2 Blends

| | 2-1 | 2-2 | 2-3 | 2-4 | 2-5 | 2-6 | 2-7 | 2-8 | 2-9 | 2-10 |
|---|---|---|---|---|---|---|---|---|---|---|
| Blend Composition (parts by weight) | | | | | | | | | | |
| F.2.2 | 0 | 0.56 | 1.68 | 2.76 | 5.42 | 18 | 12.5 | 17.5 | 25 | 37.5 |
| S.1 | 200 | 223.44 | 222.32 | 217.24 | 216.58 | 480 | 200 | 218 | 200 | 200 |
| Blend Properties | | | | | | | | | | |
| $t_{1/2}$ @ 128° C. (min) | 4.046 | 3.66 | 2.98 | 2.74 | 2.71 | 3.74 | 4.105 | 2.865 | 4.779 | 4.182 |
| Delta Hc @ 128° C. (J/g) | −98.18 | −91.03 | −95.47 | −96.26 | −97.79 | −95.34 | −93.15 | −89.46 | −88.16 | −86.49 |
| Tm (° C.) | 162.91 | 162.41 | 162.08 | — | 163.57 | 163.64 | 160.87 | 161.03 | 160.03 | 161.37 |
| Tc (° C.) | 116.15 | 117.14 | 118.48 | — | 118.32 | 117.2 | 116.59 | 116.58 | 115.92 | 115.76 |
| Delta Hf (J/g) | 99.82 | 100.15 | 99.45 | — | 100.44 | 99.96 | 113.58 | 108.04 | 107.12 | 105.79 |
| MFR (g/10 min) | 44.58 | 39.95 | 38.88 | 40.41 | 48.66 | — | 46.24 | 49.4 | 58.88 | 54.28 |

TABLE 5

Example 3 Blends

| | 3-1 | 3-2 | 3-3 | 3-4 | 3-5 | 3-6 | 3-7 | 3-8 | 3-9 | 3-10 |
|---|---|---|---|---|---|---|---|---|---|---|
| Blend Composition (parts by weight) | | | | | | | | | | |
| F.2.3 | 0 | 0.56 | 1.68 | 2.76 | 5.42 | 18 | 12.5 | 17.5 | 25 | 37.5 |
| S.1 | 200 | 223.44 | 222.32 | 217.24 | 216.58 | 480 | 200 | 218 | 200 | 200 |
| Blend Properties | | | | | | | | | | |
| $t_{1/2}$ @ 128° C. (min) | 4.046 | 3.79 | 3.28 | 2.85 | 2.32 | 4.34 | 4.291 | 4.454 | 4.233 | 3.408 |
| Delta Hc @ 128° C. (J/g) | −98.18 | −98.51 | −96.83 | −98.78 | −93.52 | −95.96 | −92.21 | −89.72 | −89.29 | −85.63 |
| Tm (° C.) | 162.91 | 162.24 | 162.25 | 163.08 | 162.08 | 161.14 | 161.03 | 163.53 | 160.53 | 160.37 |

TABLE 5-continued

Example 3 Blends

| | Example | | | | | | | | | |
|---|---|---|---|---|---|---|---|---|---|---|
| | 3-1 | 3-2 | 3-3 | 3-4 | 3-5 | 3-6 | 3-7 | 3-8 | 3-9 | 3-10 |
| Tc (° C.) | 116.15 | 117.14 | 117.81 | 118.15 | 119.48 | 116.21 | 116.42 | 116.91 | 116.42 | 116.42 |
| Delta Hf (J/g) | 99.82 | 101.43 | 101.01 | 99.48 | 99.55 | 103.86 | 111.29 | 105.99 | 106.16 | 103.66 |
| MFR (g/10 min) | 44.58 | 42.56 | 54.48 | 38.19 | 43.31 | — | 51.35 | 52.49 | 55.44 | 60.84 |

Figure 1A:
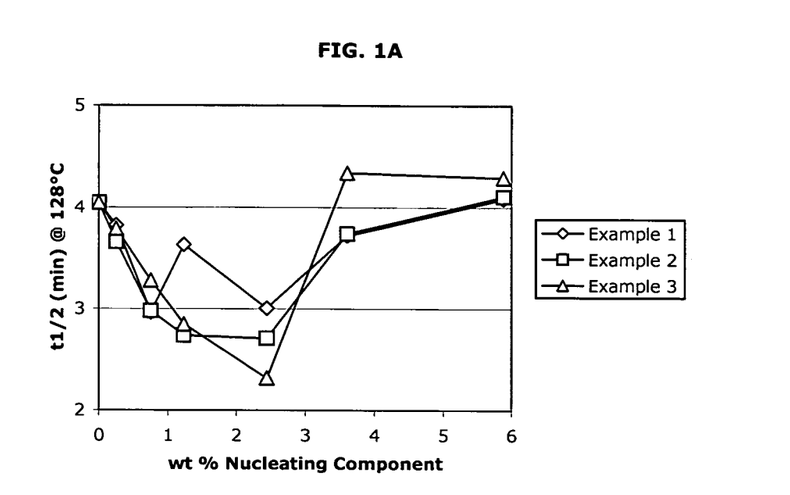
FIG. 1A plots the crystallization half-time ($t_{1/2}$) at 128° C. versus the weight percent of the nucleating polymer component (NPC) for the melt mixtures of Examples 1-3 according to embodiments of the invention.
Figure 1B:
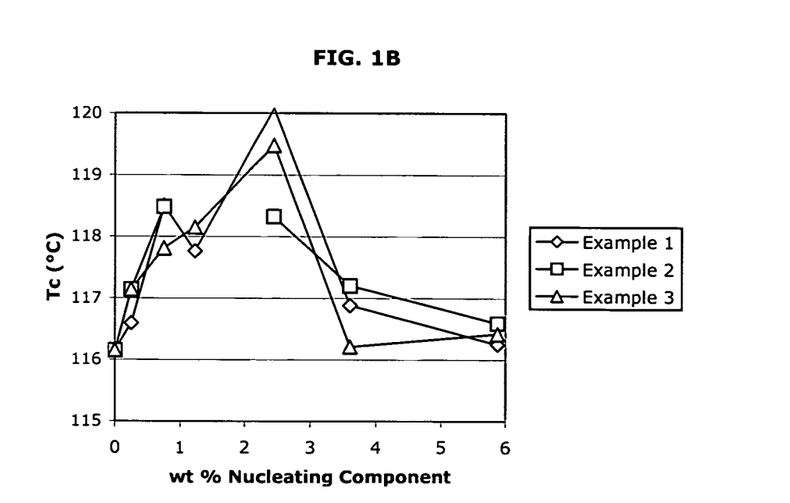
FIG. 1B plots the crystallization temperature (Tc) versus the weight percent of the NPC for the melt mixtures of Examples 1-3 according to embodiments of the invention.
Figure 2:
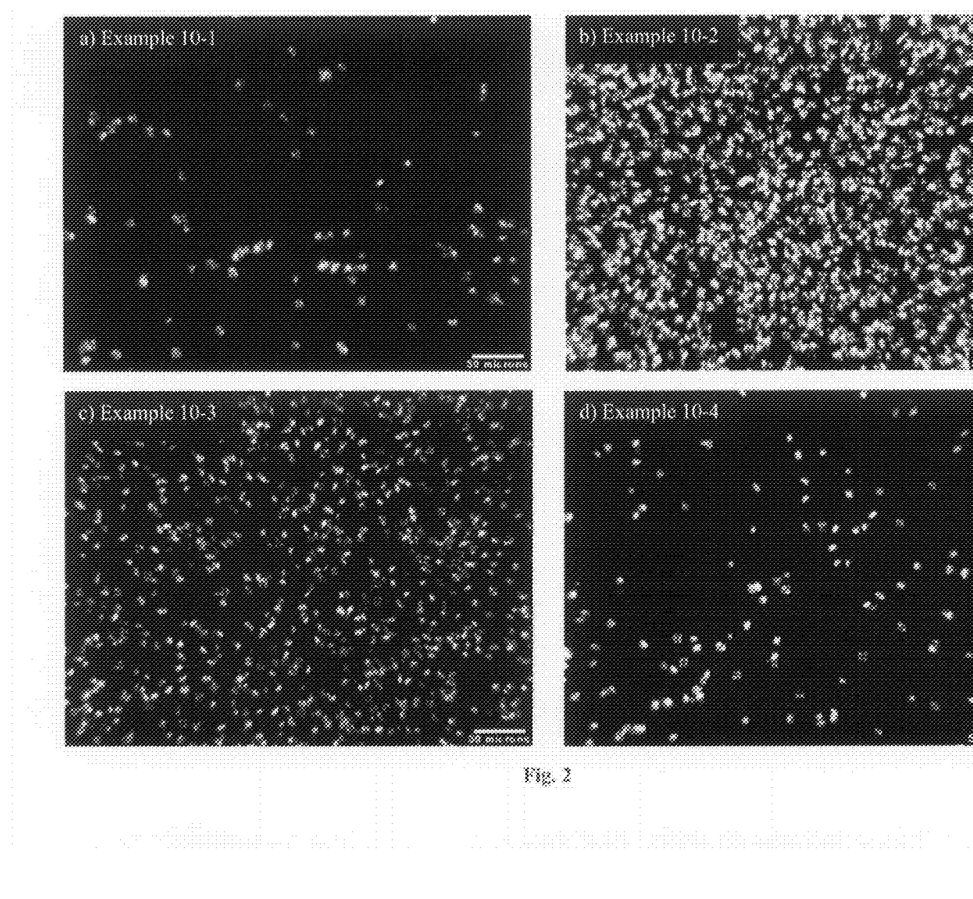
FIG. 2 is a series of optical micrographs showing the density of nucleation sites following isothermal crystallization at 128° C. for 300 s on a hotstage of the melt mixtures of Examples 10-1, 10-2, 10-3 and 10-4, indicating a pronounced maxima of nucleation for Example 10-2 (2 wt % NPC) according to an embodiment.

The crystallization half-time ($t_{1/2}$) at 128° C. versus the weight percent of the NPC for the blends of Examples 1-3 is plotted in FIG. 1A, which shows a decreasing half-time at low NPC contents and then an increase above a minima with higher NPC contents. Similarly, the crystallization temperature (Tc) versus the weight percent of the NPC for the blends of Examples 1-3 is plotted in FIG. 1B, which shows an increasing Tc at low NPC content and then a decrease above a maxima with the higher NPC contents.

TABLE 6

Example 4 Blends

| | Example | | | | |
|---|---|---|---|---|---|
| | 4-1 | 4-2 | 4-3 | 4-4 | 4-5 |
| Blend Composition (parts by weight) | | | | | |
| F.2.4 | 0 | 0.8 | 1.6 | 5 | 3.5 |
| S.1 | 65 | 64.2 | 63.4 | 125 | 61 |
| Blend Properties | | | | | |
| $t_{1/2}$ @ 128° C. (min) | 5.143 | 4.795 | 4.6 | 6.42 | 7.283 |
| Delta Hc @ 128° C. (J/g) | -98.29 | -96.66 | -96.01 | -97.71 | -87.13 |
| Tm (° C.) | 161.17 | 160.66 | 161.31 | 166.69 | 160.19 |
| Tc (° C.) | 115.4 | 116.57 | 116.21 | 116.57 | 114.26 |
| Delta Hf (J/g) | 101.07 | 101.17 | 100.1 | 93.2 | 98.99 |
| MFR (g/10 min) | 40.32 | 38.74 | 56.79 | 49.61 | 54.69 |

TABLE 7

Example 5 Blends

| | Example | | | | |
|---|---|---|---|---|---|
| | 5-1 | 5-2 | 5-3 | 5-4 | 5-5 |
| Blend Composition (parts by weight) | | | | | |
| F.2.5 | 0 | 0.8 | 1.6 | 5 | 3.5 |
| S.1 | 65 | 64.2 | 63.4 | 125 | 61 |
| Blend Properties | | | | | |
| $t_{1/2}$ @ 128° C. (min) | 5.143 | 3.571 | 4.567 | 5.724 | 6.086 |
| Delta Hc @ 128° C. (J/g) | -98.29 | -98.43 | -96.55 | -95.07 | -94.12 |
| Tm (° C.) | 161.17 | 161.09 | 161.16 | 160.85 | 161.85 |
| Tc (° C.) | 115.4 | 117.29 | 116.21 | 114.92 | 114.58 |
| Delta Hf (J/g) | 101.07 | 100.94 | 97.47 | 97.18 | 94.39 |
| MFR (g/10 min) | 40.32 | 47.66 | 39.53 | 62.31 | 61.99 |

TABLE 8

Example 6 Blends

| | Example 6- | | | | |
|---|---|---|---|---|---|
| | 6-1 | 6-2 | 6-3 | 6-4 | 6-5 |
| Blend Composition (parts by weight) | | | | | |
| F.2.6 | 0 | 0.8 | 1.6 | 5 | 3.5 |
| S.1 | 65 | 64.2 | 63.4 | 125 | 61 |
| Blend Properties | | | | | |
| $t_{1/2}$ @ 128° C. (min) | 5.143 | 3.676 | 3.488 | 6.609 | 7.394 |
| Delta Hc @ 128° C. (J/g) | -98.29 | -96.2 | -96.63 | -93.03 | -92.09 |
| Tm (° C.) | 161.17 | 162.17 | 167.34 | 161.99 | 160.8 |
| Tc (° C.) | 115.4 | 117.41 | 119.39 | 114.7 | 114.71 |
| Delta Hf (J/g) | 101.07 | 100.26 | 93.90 | 96.48 | 89.15 |
| MFR (g/10 min) | 40.32 | 38.28 | 40.44 | 49.22 | 44.35 |

TABLE 9

Example 7 Blends

| | Example 7- | | | | |
|---|---|---|---|---|---|
| | 1 | 2 | 3 | 4 | 5 |
| Blend Composition (parts by weight) | | | | | |
| F.2.7 | 0 | 0.8 | 1.6 | 5 | 3.5 |
| S.1 | 65 | 64.2 | 63.4 | 125 | 61 |
| Blend Properties | | | | | |
| $t_{1/2}$ @ 128° C. (min) | 5.143 | 4.497 | 2.317 | 5.63 | 6.689 |
| Delta Hc @ 128° C. (J/g) | -98.29 | -96.69 | -84.85 | -92.22 | -92.67 |
| Tm (° C.) | 161.17 | 162.31 | 162 | 161.32 | 162.16 |
| Tc (° C.) | 115.4 | 117.04 | 116.57 | 115.04 | 115.38 |
| Delta Hf (J/g) | 101.07 | 99.93 | 99.05 | 97.35 | 95.82 |
| MFR (g/10 min) | 40.32 | 32.70 | 34.19 | 35.24 | 41.84 |

TABLE 10

Example 8 Blends

| | Example | | | | | |
|---|---|---|---|---|---|---|
| | 8-1 | 8-2 | 8-3 | 8-4 | 8-5 | 8-8 |
| Blend Composition (parts by weight) | | | | | | |
| F.2.8 | 0 | 18.5 | 49 | 92.75 | 125 | 157.25 |
| S.1 | 250 | 231.5 | 201 | 157.25 | 125 | 92.75 |
| Blend Properties | | | | | | |
| $t_{1/2}$ @ 128° C. (min) | 8.1 | 2.2 | 2.3 | 3.2 | 4.8 | 8 |
| $t_{1/2}$ @ 125° C. (min) | 3.6 | 1 | 1.2 | 1.7 | 2.8 | 4.5 |

TABLE 11

Example 9 Blends

| | \multicolumn{10}{c}{Example} |
|---|---|---|---|---|---|---|---|---|---|---|
| | 9-1 | 9-2 | 9-3 | 9-4 | 9-5 | 9-6 | 9-7 | 9-8 | 9-9 | 9-10 |
| Blend Composition (parts by weight) | | | | | | | | | | |
| F.2.9 | 0 | 0.56 | 1.68 | 2.76 | 5.42 | 18 | 12.5 | 17.5 | 25 | 37.5 |
| S.1 | 200 | 223.44 | 222.32 | 217.24 | 216.58 | 480 | 200 | 218 | 200 | 200 |
| Blend Properties | | | | | | | | | | |
| $t_{1/2}$ @ 128° C. (min) | 7.925 | 5.512 | 4.181 | 4.292 | 2.919 | 8.724 | 5.914 | 5.674 | 8.783 | 8.419 |
| $t_{1/2}$ @ 125° C. (min) | 3.6 | 2.928 | 2.333 | 2.411 | 1.577 | 4.534 | 3.206 | 3.006 | 4.516 | 4.154 |

TABLE 12

Example 10 Blends

| | Example | | | |
|---|---|---|---|---|
| | 10-1 | 10-2 | 10-3 | 10-4 |
| Blend Composition (parts by weight) | | | | |
| F.2.9 | 0 | 0.6 | 1.5 | 3 |
| S.1 | 30 | 29.4 | 28.5 | 27 |
| Blend Properties | | | | |
| $t_{1/2}$ @ 128° C. (min) | 9.49 | 1.87 | 2.51 | 4.04 |
| Delta Hc @ 128° C. (J/g) | −93.68 | −93.14 | −95.36 | −93.31 |
| MFR (g/10 min) | 34.90 | 37.70 | 51.80 | 72.60 |

TABLE 13

Example 11 Blends

| | Example | | | |
|---|---|---|---|---|
| | 11-1 | 11-2 | 11-3 | 11-4 |
| Blend Composition (parts by weight) | | | | |
| F.2.9 | 0 | 0.6 | 1.5 | 3 |
| S.2 | 30 | 29.4 | 28.5 | 27 |
| Blend Properties | | | | |
| $t_{1/2}$ @ 128° C. (min) | 2.54 | 2.85 | 1.83 | 4.71 |
| Delta Hc @ 128° C. (J/g) | −91.09 | −88.71 | −85.75 | −86.4 |
| MFR (g/10 min) | 60.00 | 66.50 | 84.10 | 108.60 |

TABLE 14

Example 12 Blends

| | Example | | | | | | | |
|---|---|---|---|---|---|---|---|---|
| | 12-1 | 12-2 | 12-3 | 12-4 | 12-5 | 12-6 | 12-7 | 12-8 |
| Blend Composition (parts by weight) | | | | | | | | |
| F.2.9 | 0 | 5 | 10 | 20 | 30 | 40 | 50 | 60 |
| S.3 | 250 | 245 | 240 | 230 | 220 | 210 | 200 | 190 |
| Blend Properties | | | | | | | | |
| $t_{1/2}$ @ 106° C. (min) | 1.75 | 1.042 | 1.353 | 1.896 | 2.313 | 2.562 | 2.451 | 2.486 |
| Delta Hc @ 106° C. (J/g) | | −55.2 | −54.47 | −54.16 | −53.95 | −53.33 | −52.52 | −52.07 |
| $t_{1/2}$ @ 103° C. (min) | 1.085 | 0.81 | 1 | 1.346 | 1.583 | 1.722 | 1.669 | 1.665 |
| Delta Hc @ 103° C. (J/g) | | −53.16 | −51.21 | −52.1 | −53.15 | −51.86 | −52.02 | −50.39 |

TABLE 15

Example 13 Blends

| | Example | | | |
|---|---|---|---|---|
| | 13-1 | 13-2 | 13-3 | 13-4 |
| Blend Composition (parts by weight) | | | | |
| F.2.9 | 0 | 40 | 100 | 200 |
| S.3 | 2000 | 1960 | 1900 | 1800 |
| Blend Properties | | | | |
| Delta Hc @ 109° C. (J/g) | | | | |
| Tm (° C.) | 139.2 | 138.8 | 138.8 | 138.5 |
| Tc (° C.) | 93.55 | 96.18 | 97.01 | 96.35 |
| Delta Hf (J/g) | 87.76 | 90.05 | 86.21 | 75.83 |
| MFR (g/10 min) | 3.50 | 5.45 | 3.50 | 17.36 |
| Elongation @ break (%) | 584.19 | 617.06 | 654.36 | 640.05 |

TABLE 15-continued

Example 13 Blends

| | Example | | | |
|---|---|---|---|---|
| | 13-1 | 13-2 | 13-3 | 13-4 |
| Tensile strength (MPa (psi)) | 29.1 (4222.7) | 28.8 (4182.9) | 27.9 (4048.4) | 27.2 (3941.8) |
| 1% Sec modulus (MPa ($10^3$ psi)) | 678 (98.38) | 655 (94.93) | 663 (96.18) | 618 (89.66) |

TABLE 16

Example 14 Blends

| | Example 14- | | | | |
|---|---|---|---|---|---|
| | 1 | 2 | 3 | 4 | 5 |
| Blend Composition (parts by weight) | | | | | |
| F.2.9 | 0 | 40 | 100 | 200 | 400 |
| S.4 | 2000 | 1960 | 1900 | 1800 | 1600 |
| Blend Properties | | | | | |
| Tm (° C.) | 150.7 | 151.5 | 151.4 | 149.2 | 148.9 |
| Tc (° C.) | 105.9 | 104.6 | 102.1 | 97.7 | 98.0 |
| Delta Hf (J/g) | 15.5 | 13.0 | 15.8 | 22.1 | 25.3 |
| MFR (g/10 min) | 49.3 | 56.7 | | | |
| Elongation @ break (%) | 173 | 212 | 264 | 345 | 220 |
| Tensile strength (MPa (psi)) | 4.93 (715) | 5.31 (771) | 5.93 (860) | 6.82 (990) | 5.66 (820) |
| 1% Sec modulus (MPa ($10^3$ psi)) | 34.1 (4.95) | 36.0 (5.22) | 37.6 (5.46) | 45.0 (6.53) | 51.4 (7.45) |

TABLE 17

Example 15 Blends

| | Example | | | | |
|---|---|---|---|---|---|
| | 15-1 | 15-2 | 15-3 | 15-4 | 15-5 |
| Blend Composition (parts by weight) | | | | | |
| F.2.9 | 0 | 40 | 100 | 200 | 400 |
| S.5 | 2000 | 1960 | 1900 | 1800 | 1600 |
| Blend Properties | | | | | |
| Tm (° C.) | 48.22 | 48.68 | 48.4, 121.9 | 48.4, 124.0 | 48.3, 110.0, 127.8 |
| Tc (° C.) | | | | | |
| Rheometer Tc onset (° C.) | 49 | 71 | 76 | 90 | 101 |
| Delta Hf (J/g) | 29.44 | 29.98 | 30.13 | 33.48 | 35.93 |
| MFR (g/10 min) | 7.70 | 9.40 | 10.45 | 17.70 | 27.36 |
| Elongation @ break (%) | 730 | 598 | 583 | 633 | 559 |
| Tensile strength (MPa (psi)) | 16.8 (2440) | 12.5 (1810) | 12.9 (1870) | 19.5 (2830) | 15.7 (2280) |
| 1% Sec modulus (MPa ($10^3$ psi)) | 41.3 (5.99) | 43.8 (6.35) | 32.6 (4.73) | 50.7 (7.36) | 68.1 (9.87) |

TABLE 18

Comparative Example 1 Blends

| | Comparative Example | | | | |
|---|---|---|---|---|---|
| | 1-1 | 1-2 | 1-3 | 1-4 | 1-5 |
| Blend Composition (parts by weight) | | | | | |
| F.1.1 | 0 | 6.5 | 13 | 19 | 27 |
| S.1 | 500 | 493.5 | 487 | 481 | 473 |
| Blend Properties | | | | | |
| $t_{1/2}$ @ 128° C. (min) | 6.36 | 5.62 | 4.91 | 9.09 | 10.97 |
| MFR (g/10 min) | 35.87 | 39.60 | 40.20 | 51.26 | — |

TABLE 19

Comparative Example 2 Blends

| | Comparative Example | | | | | |
|---|---|---|---|---|---|---|
| | 2-1 | 2-2 | 2-3 | 2-4 | 2-5 | 2-6 |
| Blend Composition (parts by weight) | | | | | | |
| F.1.2 | 0 | 6.5 | 13 | 19 | 27 | 50 |
| S.1 | 500 | 493.5 | 487 | 481 | 473 | 450 |
| Blend Properties | | | | | | |
| $t_{1/2}$ @ 128° C. (min) | 6.36 | 3.22 | 2.98 | 5.53 | 2.59 | 3.98 |
| MFR (g/10 min) | 35.87 | 58.00 | 58.00 | 65.00 | 100.00 | 160.00 |

TABLE 20

Comparative Example 3 Blends

| | Comparative Example | | | | |
|---|---|---|---|---|---|
| | 3-1 | 3-2 | 3-3 | 3-4 | 3-5 |
| Blend Composition (parts by weight) | | | | | |
| F.1.3 | 0 | 6.5 | 13 | 19 | 27 |
| S.1 | 500 | 493.5 | 487 | 481 | 473 |
| Blend Properties | | | | | |
| $t_{1/2}$ @ 128° C. (min) | 6.36 | 6.07 | 5.57 | 7.74 | 6.76 |
| MFR (g/10 min) | 35.87 | 36.10 | 35.10 | 33.30 | 33.60 |

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference to the extent they are not inconsistent with the invention herein for all jurisdictions in which such incorporation is permitted.

What is claimed is:

1. A nucleated polypropylene composition comprising:
   a. a matrix having a melting point greater than about 110° C. and comprising an isotactic polypropylene homopolymer; and
   b. mixed therewith from 1.5 to 3 percent by weight (based on the weight of the nucleated polypropylene composition) of a nucleating polymer component comprising a metallocene-catalyzed propylene-ethylene copolymer consisting of 65 to 95 percent by weight of propylene derived units and 5 to 35 percent by weight of ethylene-derived units (based upon the weight of the nucleating polymer component) and having a percent crystallinity of from 25% to about 75%, a triad tacticity greater than 75%, a heat of fusion from 5 to 50 J/g, a melt flow rate between 300 g/10 min to 5000 dg/min, and less than 1000 ppm by weight of residues of a molecular degradation agent;
      wherein the nucleated polypropylene composition has flexural modulus (1% secant) of less than 310 MPa, and the ratio of flexural modulus (1% secant) of the nucleated polypropylene composition to the flexural modulus (1% secant) of the same matrix without the nucleating polymer component is between 0.9 and 1.2; and further wherein the ratio of half time of crystallization (in minutes) of the nucleated polypropylene composition to the same matrix without the nucleating polymer is between 0.3 and 0.8.

2. The nucleated polypropylene composition of claim 1, wherein the matrix has an MFR of less than 10 dg/min.

3. The nucleated polypropylene composition of claim 1, wherein the nucleating polymer component has:
   a melting point between 25° C. and 110° C.;
   a tacticity index (m/r) from 4 to 12; and
   a molecular weight distribution Mw/Mn between 1.5 and 40.

4. The nucleated polypropylene composition of claim 1 wherein the nucleating polymer component comprises one or more of the following characteristics:
   a proportion of inversely inserted propylene units greater than 0.5%, based on 2,1 insertion of propylene monomer in all propylene insertions;
   a proportion of inversely inserted propylene units greater than 0.05%, based on 1,3 insertion of propylene monomer in all propylene insertions.

5. The nucleated polypropylene composition of claim 1, wherein the matrix comprises a heterogeneous blend of the isotactic polypropylene homopolymer with rubbers and elastomers.

6. The nucleated polypropylene composition of claim 1, further comprising a plasticizer.

7. An article comprising the nucleated polypropylene composition of claim 1.

8. The nucleated polypropylene composition of claim 1, wherein the nucleating polymer component has a melting point of less than or equal to 98.19° C.

9. A method of nucleating an isotactic polypropylene composition comprising:
   a. melt mixing (i) a matrix having a melting point greater than about 110° C. and comprising an isotactic polypropylene homopolymer, and (ii) from 1.5 to 3 percent by weight of a nucleating polymer component (said weight percent based on the combined weight of the matrix and the nucleating polymer component) comprising a propylene-ethylene copolymer consisting of 65 to 95 percent by weight of the nucleating polymer component of propylene derived units and 5 to 35 percent by weight of the nucleating polymer component of ethylene derived units, and having a percent crystallinity of from 25% to about 75%, a triad tacticity greater than 75%, a heat of fusion from 5 to 50 J/g, a melt flow rate between 300 g/10 min to 5000 dg/min, and less than 1000 ppm by weight of residues of a molecular degradation agent;
   b. cooling the mixture from the melt to a temperature below the peak crystallization point to initiate crystallization onset; and
   c. obtaining a nucleated polypropylene composition having flexural modulus (1% secant) of less than 310 MPa, wherein the ratio of flexural modulus (1% secant) of the nucleated polypropylene composition to the flexural modulus (1% secant) of the same matrix without the nucleating polymer component is between 0.9 and 1.2; and further wherein the ratio of half time of crystallization (in minutes) of the nucleated polypropylene composition to the same matrix without the nucleating polymer component is between 0.3 and 0.8.

10. The method of claim 9, wherein the crystallization onset is at a temperature above the melting point of the nucleating polymer component.

11. The method of claim 9, further comprising forming the melt mixture into a shaped article and maintaining the shape through the cooling.

12. The method of claim 11, wherein the forming comprises introducing the melt mixture into a mold, wherein the cooling of the article occurs in the mold, and further comprising removing the cooled article from the mold.

13. The method of claim 9, wherein the matrix has an MFR less than 10 g/10 min.

14. The method of claim 9, wherein the matrix comprises a heterogeneous blend of the isotactic polypropylene homopolymer with rubbers and elastomers.

15. A method of forming an article from an isotactic polypropylene composition comprising:
   a. forming a melt mixture by melt mixing (i) a primary polypropylene component having a melting point greater than about 110° C. and comprising an isotactic polypropylene homopolymer, and (ii) from 1.5 to 3 percent by weight of the melt mixture of a nucleating polymer component consisting of a copolymer of propylene derived units in a proportion of from 65 to 95 percent by weight of the nucleating polymer component and ethylene derived units in a proportion of from 5 to 35 percent by weight of the nucleating polymer component, and having a percent crystallinity of from 25% to about 75%, a triad tacticity greater than 75%, a heat of fusion from 5 to 50 J/g, a melt flow rate between 300 g/10 min to 5000 dg/min, and less than 1000 ppm by weight of residues of a molecular degradation agent;

wherein the melt mixture has flexural modulus (1% secant) of less than 310 MPa, and the ratio of flexural modulus (1% secant) of the melt mixture to the flexural modulus (1% secant) of the same primary polypropylene component without the nucleating polymer component is between 0.9 and 1.2, and further wherein the ratio of half time of crystallization (in minutes) of the melt mixture to the primary polypropylene component is between 0.3 and 0.8;

b. introducing the melt mixture into a mold comprising a shape of an article;

c. cooling the mixture from the melt in the mold to a temperature below the peak crystallization point of the matrix to initiate crystallization onset, wherein the crystallization onset is at a temperature above the melting point of the nucleating polymer component; and d. removing the cooled article from the mold.

16. The article obtained from the method of claim 15.

\* \* \* \* \*